US008239866B2

(12) United States Patent
Carrie (10) Patent No.: US 8,239,866 B2
(45) Date of Patent: Aug. 7, 2012

(54) REDUCTION OF MEMORY LATENCIES USING FINE GRAINED PARALLELISM AND FIFO DATA STRUCTURES

(75) Inventor: Susan Carrie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 12/429,965

(22) Filed: Apr. 24, 2009

(65) Prior Publication Data

US 2010/0275208 A1    Oct. 28, 2010

(51) Int. Cl.
*G06F 9/46* (2006.01)
*G06F 9/50* (2006.01)
*G06F 9/54* (2006.01)
*G06F 7/00* (2006.01)
*G06F 9/00* (2006.01)
*G06F 9/44* (2006.01)
*G06F 13/00* (2006.01)

(52) U.S. Cl. ........ 718/100; 718/102; 712/220; 719/312; 711/147; 717/149; 717/151

(58) Field of Classification Search .................. None
See application file for complete search history.

(56) References Cited

U.S. PATENT DOCUMENTS

| 5,502,833 | A | 3/1996 | Byrn | |
|---|---|---|---|---|
| 5,600,820 | A | 2/1997 | Johnston | |
| 5,649,230 | A | 7/1997 | Lentz | |
| 6,047,339 | A | 4/2000 | Su | |
| 7,016,349 | B1 | 3/2006 | Raza | |
| 7,103,887 | B2 | 9/2006 | Shavit | |
| 7,254,677 | B1 * | 8/2007 | Lowe et al. | 711/118 |
| 7,793,276 | B2 * | 9/2010 | Dai et al. | 717/149 |
| 2007/0033302 | A1 | 2/2007 | Lin | |
| 2007/0192516 | A1 | 8/2007 | Ibrahim | |
| 2008/0313363 | A1 | 12/2008 | Granit et al. | |
| 2009/0282222 | A1 * | 11/2009 | Hoover et al. | 712/220 |
| 2009/0282227 | A1 * | 11/2009 | Hoover et al. | 712/227 |
| 2010/0223605 | A1 * | 9/2010 | Dai et al. | 717/151 |

OTHER PUBLICATIONS

Forecsco.doc, Downloaded from INternet Feb. 11, 2009, 9 pages.

* cited by examiner

*Primary Examiner* — Qing Wu
(74) *Attorney, Agent, or Firm* — Woodcock Washburn LLP (57) ABSTRACT

Software rendering and fine grained parallelism are utilized to reduce/avoid memory latency in a multi-processor (MP) system. According to one embodiment, the management of the transfer of data from one processor to another in the MP environment is moved into a low overhead hardware system. The low overhead hardware system may be a FIFO ("First In First Out") hardware control. Each FIFO may be real or virtual.

20 Claims, 9 Drawing Sheets

REDUCTION OF MEMORY LATENCIES USING FINE GRAINED PARALLELISM AND FIFO DATA STRUCTURES

BACKGROUND

Many proposals for dealing with memory latencies hide memory latency with the use of context or fiber switching. Memory latencies may be especially problematic in intensive processing environments such as computer graphics. This may become especially significant if software rendering is employed rather than specialized graphics hardware.

In context or fiber switching schemes, a context or fiber, which initiates a long latency read, is idled and another context runs until the data arrives. However, in code where the ratio of reads to processing is relatively high this may result in a high number of idled contexts. Since each context requires support for a register set the cost of supporting such a scheme is high. However, streaming processing can often be broken into stages, which do not feed back to each other. In other words, the code looks as follows:

```
for (many iterations) {
    fetch 'a'
    do processing with 'a'
    fetch 'b'
    do processing with 'b'
    fetch 'c'
    do processing with 'c'
    etc.
}
```

In order to optimize the code execution, it is possible to unroll such a loop. Loop unrolling is an algorithmic technique that attempts to increase a program's execution speed (typically at the expense of its size) by reducing (or eliminating) the number of "end of loop" tests performed on each iteration. If the performance gained by eliminating the "end of loop" test offsets the performance reduction caused by the increased size of the program, performance gains may be realized. Furthermore, performance gains achieved via the use of parallelism may be realized if statements in the loop are independent of one another.

However, loop unrolling is associated with several disadvantages. The overhead of loop unrolling may include increased register usage to store temporary variables and increased code size (which may increase the number of cache misses).

In general, the level of unrolling needs to be high enough to account for the high end of the latency. Unfortunately, increasing the level of unrolling increases code complexity, increases the minimum number of iterations which can be executed efficiently, wastes more performance at the start and end of a group of processing and wastes performance when the actual latency is lower than that accounted for by the unrolling Many combinations of unrolled loops are required for different combinations of processing. For example, suppose there are 4 possible state settings associated with 'a', 3 state settings associated with 'b' and 5 possible state settings associated with 'c'. Then the number of combinations of processing 'a', 'b' and 'c' is 60. This means that 60 different pieces of code could be required to efficiently unroll any the processing associated with any set of state settings. All processing for 'a', 'b', 'c' still resides within one thread, limiting scheduling and parallelism opportunities.

Another approach to alleviate memory latencies is to utilize a parallel processing architecture in a multiple processor ("MP") environment. However, the communication between processors in a MP presents significant efficiency and overhead challenges. For example, to realize the potential of parallel computing, the distribution and coordination of computational tasks between multiple processors must be realized. If two processors respectively read and write from a shared memory area, read and write pointer information must be communicated between the two processors to prevent buffer overflow or underflow. Communication of this type of information requires additional communication and processing overhead for each processor involved in a parallel computation. Although significant computation gains may be achieved via parallelism, these gains are often mitigated by the processing overhead required to allow communication between multiple processors.

In traditional scenarios, the transfer of data from a producer to a consumer is demand based. Known approaches for handling communications between processors requires a significant amount of abstraction and software processing overhead. For example, the communication between processors may be handled by semaphores and in this instance the entirety of flow control must be handled by software instructions.

It is known that separate processing stages are utilized in GPUs ("Graphics Processing Unites") with FIFOs ("First In First Out") data structures in-between them. The typical stages are command processing, vertex fetch, vertex processing, pixel processing and frame buffer fragment processing. However, these stages have been defined by the hardware architecture of the GPU. This means that the processing stages and FIFOs are fixed. In some variations processing within GPUs is done in fewer stages, referred to as shaders, which do more complex processing. In these cases GPUs use a large number of threads to overcome read latencies incurred when shaders read from memory. Other processing systems have similar issues. In addition, some processing systems force programmers to combine the code for many stages into a single block of code to eliminate communications between processors.

Thus, a flexible approach for addressing memory latencies is required suitable for use in a processing intensive environment such as computer graphics that doesn't suffer from the limitations of single thread processing using a single thread unrolling approach or the use of FIFOs tied directly to hardware structure is necessitated.

SUMMARY

The management, coordination, and transfer of data from one processor to another in a multi-processor (MP) environment is moved into a low overhead hardware system to reduce and/or avoid memory latencies and associated overhead or to avoid the overhead of interprocessing communications. The transfer of data from one processor to another may be achieved using First-In-First-Out (FIFO) or virtual FIFO data structures. And the low overhead hardware system may comprise a plurality of FIFOs, a FIFO hardware control and state information for managing a parallel processing.

Processing is distributed across multiple threads. Hardware support is provided to allow communications between the multiple threads. According to one embodiment, the hardware support comprises virtual FIFOs.

DETAILED DESCRIPTION OF ILLUSTRATIVE EMBODIMENTS

Figure 1A:
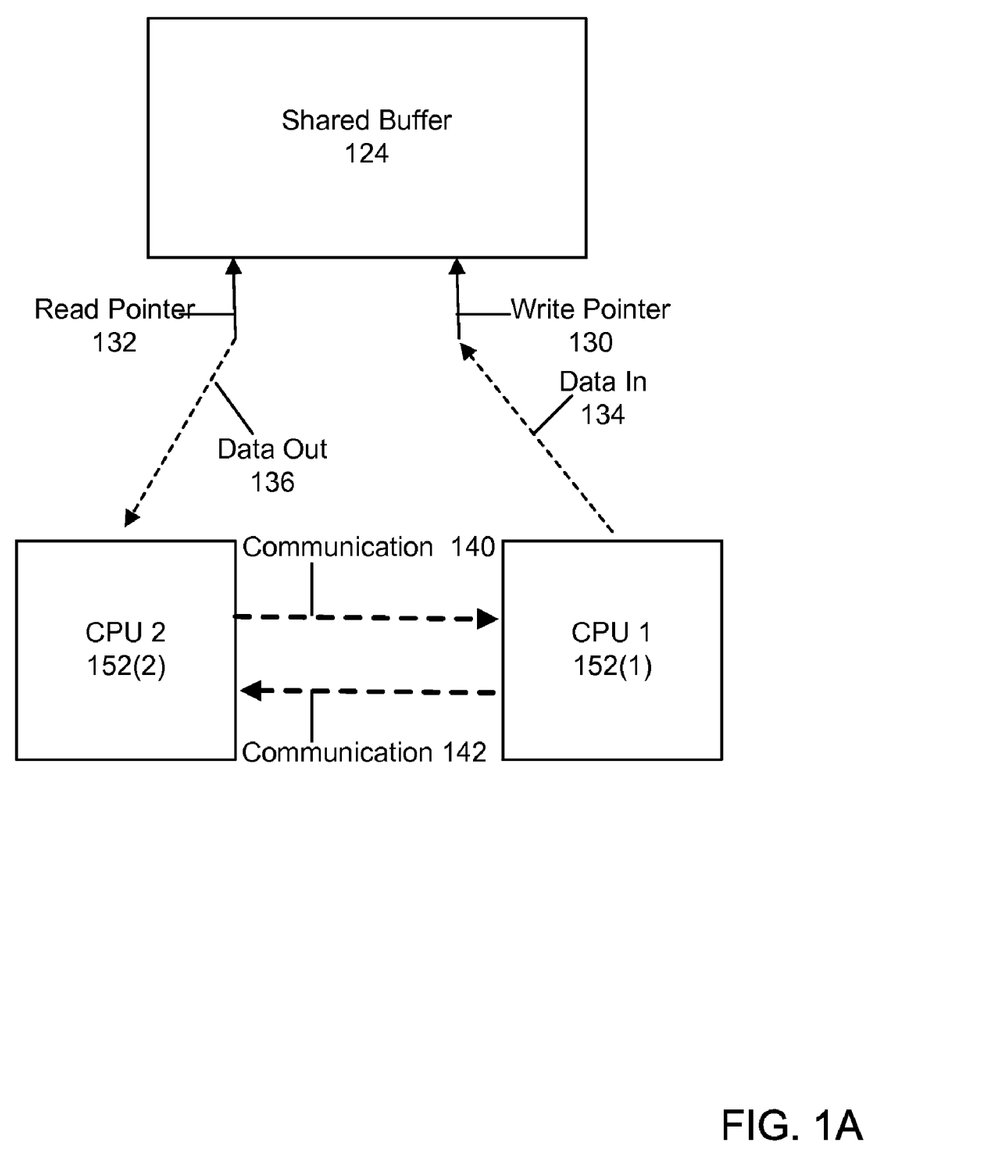
FIG. 1A is a block diagram of a system for the exchange of data between two CPUs.

FIG. 1A is a block diagram of a system for the exchange of data between two CPUs. CPU 1 152 and CPU 2 122 may operate in a parallel computation scenario, which may provide significant performance benefits over a scenario in which only a single CPU were operative. In particular, as shown in FIG. 1A, CPU 1 152(1) may generate data in 134, which it shares with CPU 2 152(2) via shared buffer 124 and is read by CPU 2 152(2) as data out 136. Shared buffer 124 may be respectively written to and read by CPU 1 152(1) and CPU 2 152(2). In order to coordinate exchange of data between CPU 1 152(1) and CPU 2 152(2), CPU 1 152(1) may maintain write pointer 130 indicating a current write location in shared buffer 124.

Similarly, CPU 2 152(2) maintains read pointer 132 indicating a current read location in shared buffer 124. In order to coordinate the exchange of data between CPU 1 152(1) and CPU 2 152(2), CPU 1 152(1) shares write pointer 130 with CPU 2 152(2) via communication 142. On the other hand, CPU 2 152(2) shares read pointer 132 with CPU 1 152(1) via communication 140. This exchange of information 140, 142 may contribute a significant overhead, which mitigates the performance benefits achieved via the parallelism exhibited by the joint operation of CPU 1 152(1) and CPU 2 152(2).

Figure 1B:
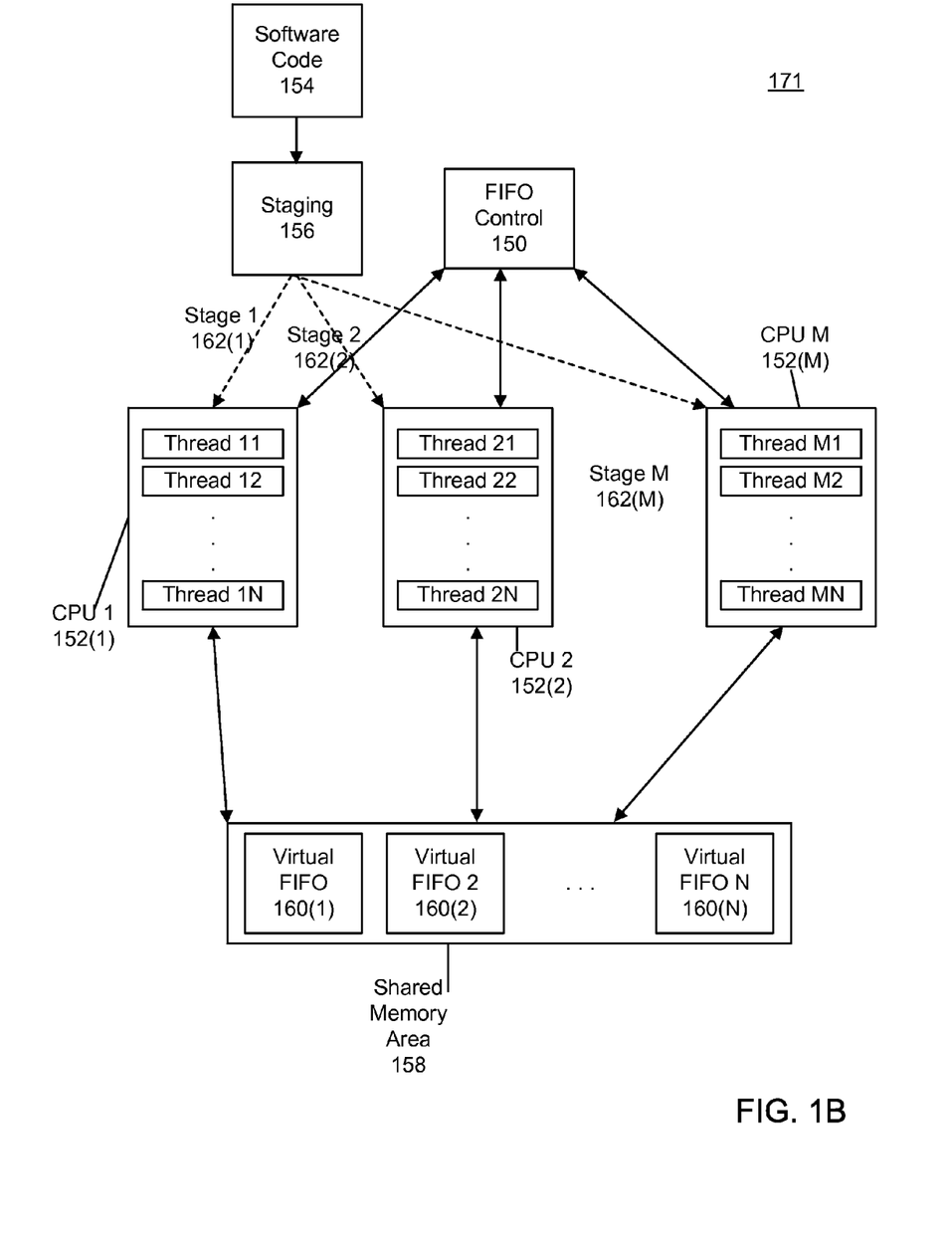
FIG. 1B is a block diagram of an exemplary architecture for reducing memory latencies by using parallel processing.

FIG. 1B is a block diagram of an exemplary architecture for reducing memory latencies by using parallel processing. In particular, parallel processing architecture 171 shown in FIG. 1B overcomes the communication overheads imposed by a scheme such as that illustrated in FIG. 1A. Referring to FIG. 1B, each processor in a MP environment 152(1)-152(M) may be associated with one or more respective FIFO data structures, which are used to transfer data from one processor to the next during a parallel processing computation. According to one embodiment, a FIFO is a data structure, which may be implemented in software or hardware, which is characterized by queue like structure and the manner in which data stored in the queue is inserted, extracted and processed. In particular, according to one embodiment, the first data to be added to the queue will be the first data to be removed, then processing proceeds sequentially in the same order According to one embodiment, in order to support the described approach, low overhead hardware (described in detail below) is provided to coordinate the parallel processing via virtual FIFOs 160(1)-160(N) and thread control of CPUs 152(1)-152(M). A virtual FIFO may provide FIFO behavioral characteristics via software but may be implemented physically on a device or medium that is not a FIFO such as a cache, for example. According to one embodiment, Virtual FIFOs may transfer the overhead of handing off data from one stage to the next from software to special purpose hardware. The structure and function of a virtual FIFO is described below.

According to one embodiment, each processor 152(1)-152(M) is not responsible for control associated with each virtual FIFO 160(1)-160(N), which would increase the processing load. Instead, each processor 152(1)-152(M) is only required to indicate from where to fetch data and to which respective virtual FIFO 160(1)-160(N) the data should be written. This scenario frees each processor from having to wait for data required during an associated processing stage.

After a data write is launched to fill a virtual FIFO, a thread running on a particular processor (e.g., thread 22 on processor 152(2)) may continue immediately with the next iteration of a loop. Once the data returns, the next processing stage may read the data (via a different processor, for example) from the appropriate virtual FIFO and may begin processing dependent on that data. This approach may allow many data fetches to be launched in close succession and as a result the processor resources required for each fetch may be reduced.

For each virtual FIFO, the associated data may be stored in the CPU's caches. As additional cachelines are needed for data they may allocated "on the fly" in the L1$ associated with a respective processor, for example. Data lines may also be allocated on the fly in a L2$ associated with a respective processor or shared between processors. The data can migrate between caches, and thus between processor clusters. According to one embodiment, there is no backing store for the data and it is retained in the caches directly.

According to one embodiment and as described in more detail below hardware associated with the cache provides FIFO control. In particular, as shown in FIG. 1B, FIFO 150 control may track which threads have opened which FIFOs for reading and/or writing and the maximum FIFO size and the head and tail pointers for each FIFO. In addition FIFO control 150 may translate the read and write requests to the appropriate virtual address, allocate (or pre-allocates) cachelines as a FIFO fills and invalidate cachelines as the FIFO is drained According to one embodiment, FIFO control 150 may coordinate with the thread scheduling for processors 152(1)-152(M) such that as a FIFO fills the thread which is filling that FIFO is slowed or idled, as a FIFO drains, the thread which is draining that FIFO is slowed or idled Furthermore, FIFO control 150 may operate such that particular stages of processing are favored to limit the total memory allocated to FIFOs at any one time, avoid deadlocks and starvation, minimize the switching between threads and fibers According to one embodiment, software may use stores to "write" data into a FIFO in one of three different ways: "direct writes" where the data is supplied as it would be for any store, "indirect writes" where software supplies a read address and hardware fetches the data and loads it into the FIFO and "processed indirect writes" were hardware also does processing on the data read before writing the FIFO.

Similarly, software may use loads to read data from a FIFO in one of two different ways: "direct reads" where the data is returned directly from the FIFO and "processed direct reads" where hw performs processing on one or more FIFO entries then returns the data.

Software may utilize portions of the virtual addresses to specify information about the access including which FIFO is being accessed, which type of access is being done (direct, indirect, processed direct, processed indirect) and the memory address from which data should be read for indirect writes and processed indirect writes.

According to one embodiment, software may provide some support. In particular, FIFO addresses may be considered volatile by the compiler to avoid inappropriate optimizations. To simplify hardware support software can be required to "open" and "close" FIFOs for reading or writing. The writer can post an address indicating that a portion of the FIFO is available to the read of the FIFO. The reader can post an address indicating that a portion of the FIFO can be discarded Note that this approach simplifies the coding required to achieve maximum performance. For example, suppose the number of possible state settings is the same as in the previous example: 4 for stage a, 3 for stage b and 5 for stage c. To optimize the processing done in stage a there are only 4 pieces of unrolled code, which need to be optimized. Similarly, only 3 and 5 pieces of code are required for stages b and c respectively. In total only 12 pieces of code need be developed and optimized, as opposed to 60 if all processing is done in a single thread. This approach may also reduce or eliminate the control code required to manage the passing of data via a FIFO to another processor.

According to one embodiment, parallel processing architecture 171 utilizes CPUs 1-M, 152(1)-152(M). The processors may be general purpose processors or special purpose processors.

Each CPU 152(1)-152(M) may execute any number of threads. For example, CPU 152(1) may execute threads 11-1N, CPU 152(2) may execute threads 21-2N and CPU 152(M) may execute threads M1-MN, which may be controlled by FIFO control 150.

A software code 154 (which is initially not adapted for parallel processing) may be adapted for parallel processing by staging block 156 into stages 162(1)-162(M). Each respective stage 162(1)-162(M) may then be associated with a respective processor 152(1)-152(M) and thread (e.g., 11-1N) on an associated processor.

Each stage may be associated with a data load, which would otherwise introduce latency into parallel processing architecture 171. In order to address the potential latency in a parallel processing environment, according to one embodiment, the parallel processing may utilize any number of virtual FIFOs 160(1)-160(N) in shared memory area 158.

In particular, each thread involved in the parallel processing computation may be associated with a virtual FIFO (i.e., 160(1)-160(N) in shared memory area 158). According to one embodiment, each virtual FIFO 160(1)-160(2) is a queue data structure such that the first data to be added to the queue will be the first data to be removed. According to one embodiment, shared memory area 158 may be a level 2 cache shared by CPUs 152(1)-152(M).

Figure 1C:
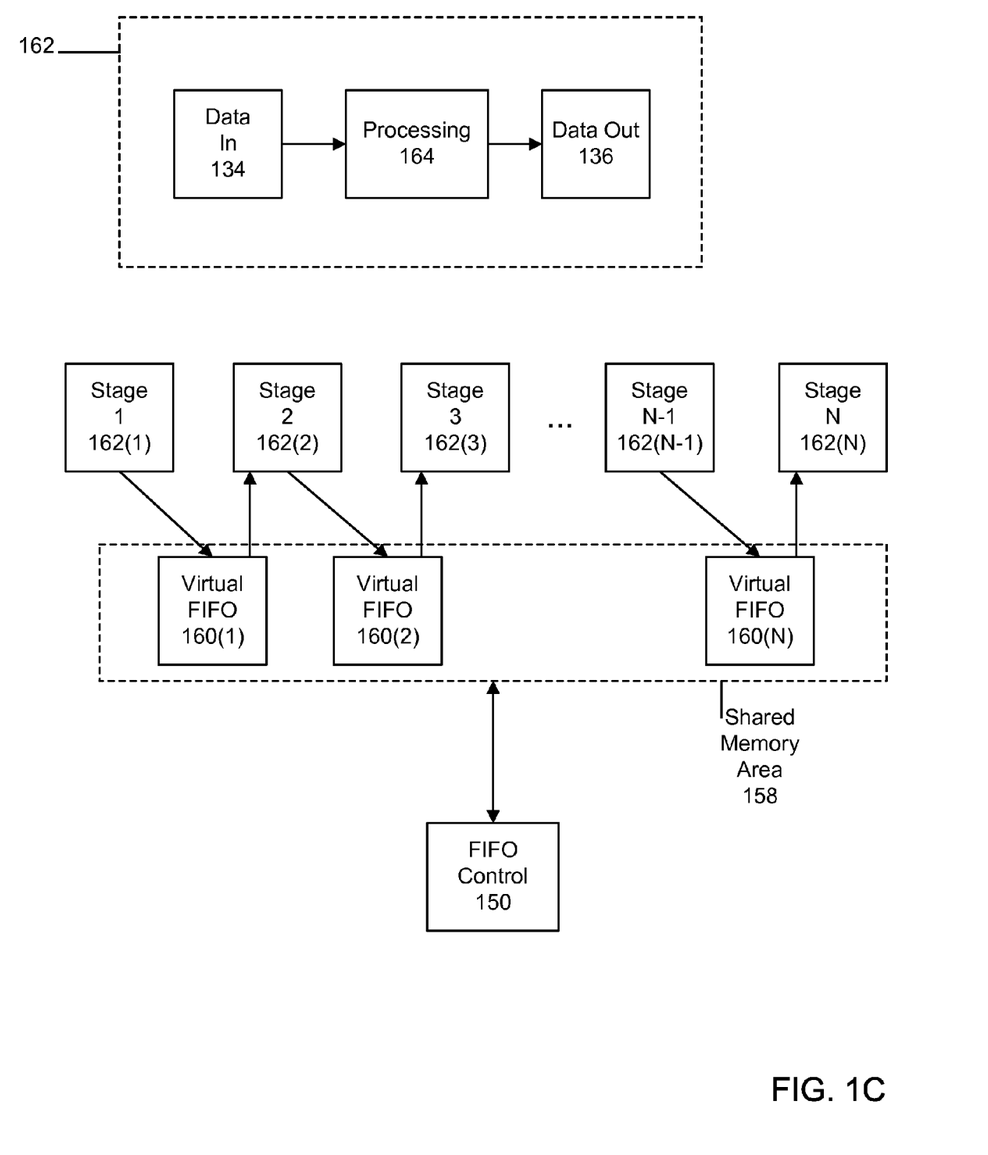
FIG. 1C is a block diagram showing a relationship between a number of software stages and virtual FIFOs.

According to one embodiment and as described in more detail with respect to FIG. 1C, if a particular stage (i.e., 162(1)-162(M)) is associated with a data load exceeding a threshold size, staging 156 modifies software code 154 to perform the data load into a virtual FIFO (i.e., 160(1)-160(N)) in a previous stage and may further modify software code 154 to read data from the virtual FIFO in the stage. This modification of software code 154 to perform data loads in previous stages may be repeated for each stage.

FIFO control 150 may coordinate a parallel processing computation involving parallel processing architecture 171 by starting and suspending respective threads as a function of the state of respective virtual FIFOs (160(1)-160(N)) during the parallel processing computation.

FIG. 1C is a block diagram showing a relationship between a number of software stages and virtual FIFOs. Each stage 162(1)-162(N) may be characterized by a data fetch 134, processing of the fetched data 164 and providing the processed data to one or more subsequent stages 136.

In order to parallelize the computation, each stage 162(1)-162(N) may be associated with a software thread running on one of a plurality of processors. Furthermore, each stage 162(1)-162(N) may be associated with one or more virtual FIFOs 160(1)-160(N). Each virtual FIFO 162(1)-162(N) may serve as a conduit for passing data from one stage to another. In particular, according to one embodiment, the data load for a stage is performed by loading the data into a respective virtual FIFO (i.e., 160(1)-160(N)) in a prior stage. Thus, for example, stage 162(2) may require particular data. Accordingly, the required data is loaded into virtual FIFO 160(1) during stage 162(1) and then subsequently read by stage 162(2). FIFO control 150 may coordinate the operation of various stages 162(1)-162(N) by starting, stopping and suspending threads as necessary. In particular, and as described in further detail below, FIFO control 150 may examine the degree to which particular virtual FIFOs 160(1)-160(N0 are filled in making a determination whether to stop, start or suspend an associated thread.

Figure 1D:
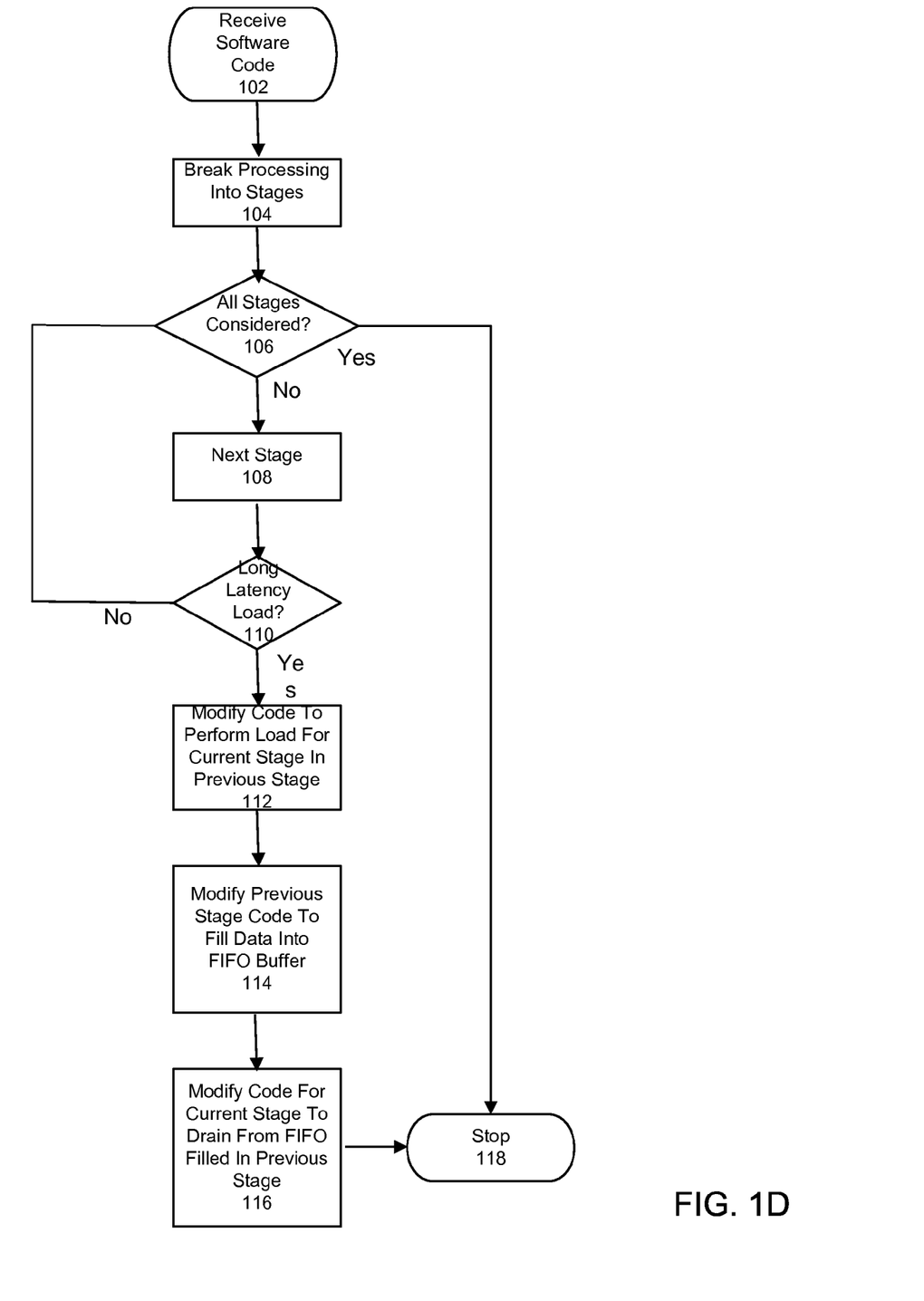
FIG. 1D is a flowchart illustrating a process for parallelizing a software code according to one embodiment.

FIG. 1D is a flowchart illustrating a process for parallelizing a software code according to one embodiment. The process illustrated in FIG. 1d may be executed, for example, by staging block 156 shown in FIG. 1B. The process is initiated in 102, where a software code to be parallelized is received. In 104, the software code is broken into a plurality of stages. In 106 it is determined whether all stages have been considered. If so ('yes' branch of 106), the process ends in 118. If not ('no' branch of 106), flow continues with 108 and the next stage is considered. In 110 it is determined whether the current stage involves a long latency load. If not ('no' branch of 110), flow continues with 106.

Otherwise ('yes' branch of 110), flow continues with 112 and the software code is modified to perform the load associated with the current stage in a previous stage. In 114 the software code for the previous stage is modified to fill data into a FIFO, which may be a virtual FIFO. In 116, the software code is modified to drain data from the FIFO (or virtual FIFO), which has been filled by the previous stage. The process ends in 118.

Figure 1E:
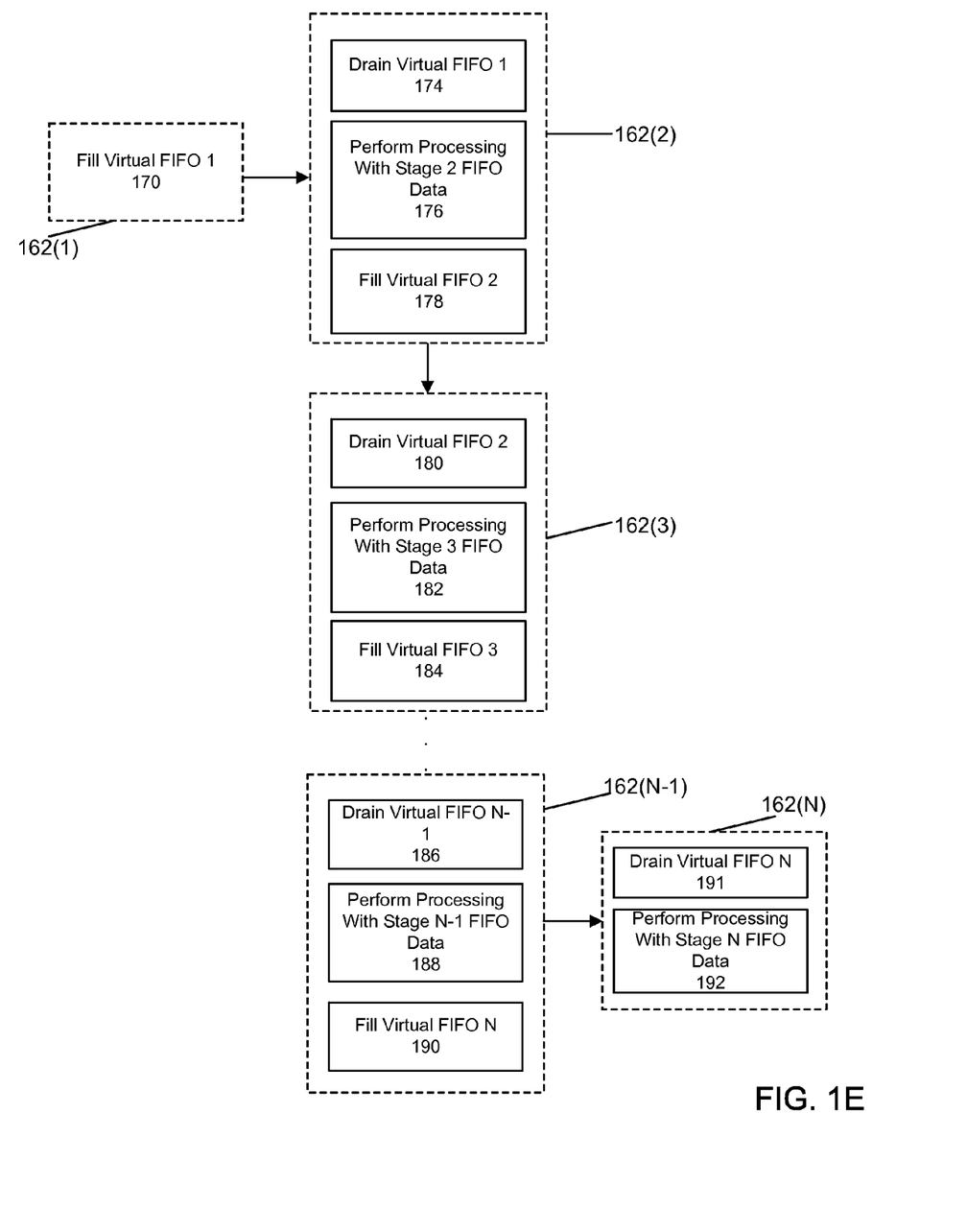
FIG. 1E illustrates a plurality of software stages after a parallelization process according to one embodiment.

FIG. 1E illustrates a plurality of software stages after a parallelization process according to one embodiment. The parallelization scheme in FIG. 1E may correspond to the relationship between virtual FIFOs 160(1)-160(N) and stages 162(1)-162(N) in FIG. 1C and may have been carried out by staging block 156. In stage 162(1), virtual FIFO 1 is filled (170). In stage 162(2), virtual FIFO 1 is drained (174). Processing is then performed with stage 2 FIFO data (176), i.e., data in FIFO 1. Virtual FIFO 2 is then filled (178).

In stage 162(3), virtual FIFO 2 is drained (180). Processing is then performed with stage 3 FIFO data (182), i.e., data in FIFO 2. Virtual FIFO 3 is then filled (184). In stage 162(N-1), virtual FIFO N-1 is drained (186). Processing is then performed with stage N-1 FIFO data (188), i.e., data in FIFO N-1. Virtual FIFO N is then filled (190). In stage 162(N), virtual FIFO N is drained (191) and processing performed with the same data (192).

Figure 2:
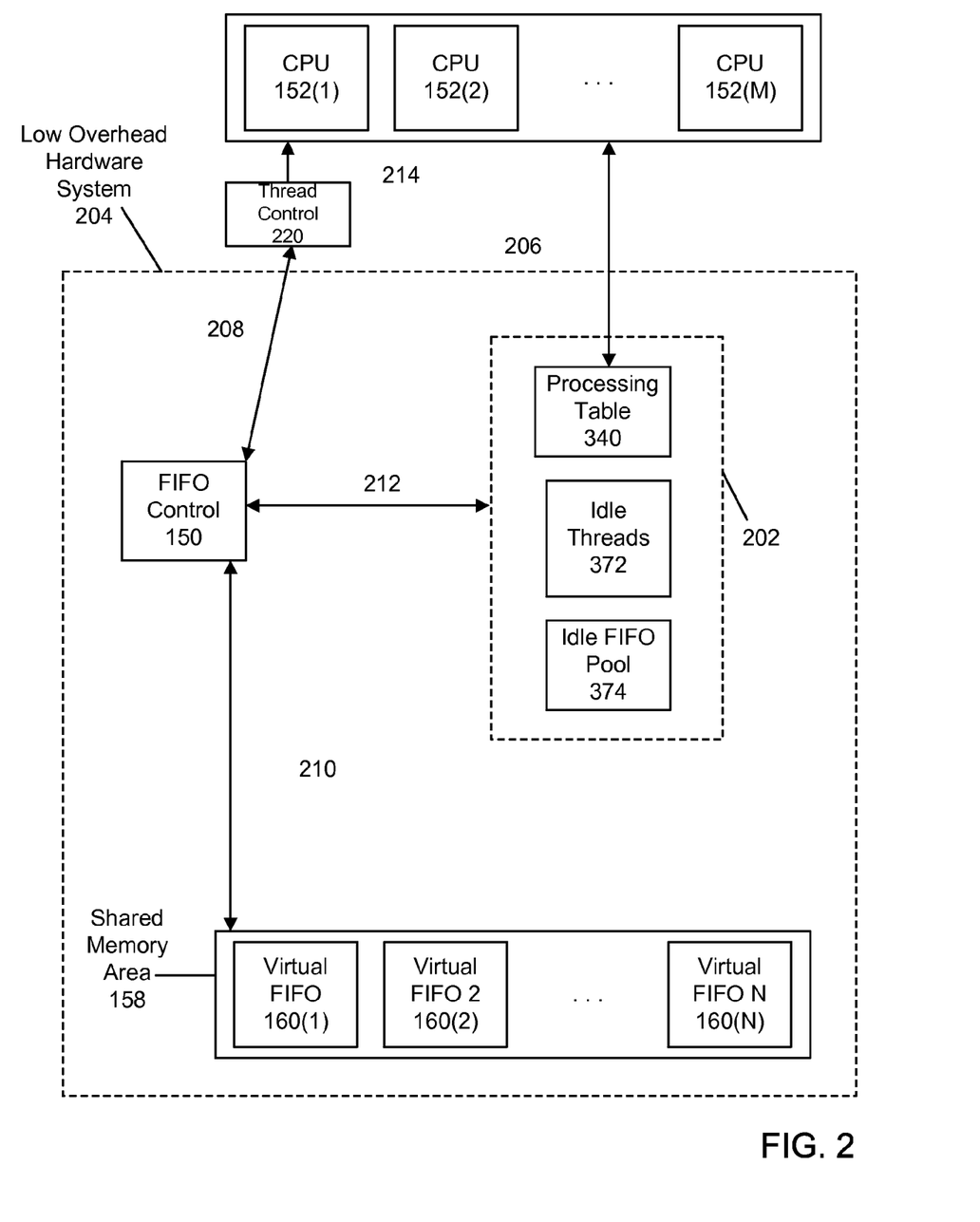
FIG. 2 is a block diagram of a hardware architecture for providing low latency memory access for an executing software code.

FIG. 2 is a block diagram of a hardware architecture for providing low latency memory access for an executing software code. The architecture shown in FIG. 2 leverages fine grained parallelism and FIFO data structures. A low overhead hardware system 204 coordinates a parallel processing on CPUs 152(1)-152(M). Low overhead hardware system 204 may comprise FIFO control 150, state information block 202 and shared memory area 158. FIFO control 150 on low overhead hardware system 204 may coordinate communication between CPUs 152(1)-152(M) via virtual FIFOs 160(1)-160(N). State information block 202 on low overhead hardware system 204 may store various information necessary to coordinate the parallel processing. According to one embodiment, state information block 202 comprises processing table 340, idle threads table 372 and idle FIFO pool 374.

Processing table 340, as described in more detail below, may include entries which indicate which CPU/thread will perform each stage of processing, assign the FIFO identifier of the FIFO to which sits, logically, between one stage and the next and assign an entry point where processing begins.

In 206, CPUs 152(1)-152(M) may read processing table to determine their respective configuration in the parallel processing such as which thread will run on which CPU and the respective virtual FIFOs associated with each thread etc. In 210 FIFO control may poll and receive information from virtual FIFOs 160(1)-160(N) regarding the amount each FIFO is currently filled. This information may be used by FIFO control 150 to start, suspend or resume particular threads associated with CPUs 152(1)-152(M). According to one embodiment, FIFO control 150 communicates with thread control block 220, which may be part of an operating system for a particular CPU, in order to cause thread control block 220 to start, stop, resume or suspend respective threads executing on CPUs 152(1)-152(M) in 214. FIFO control block 150 may also communicate with state information block 212.

Figure 3:
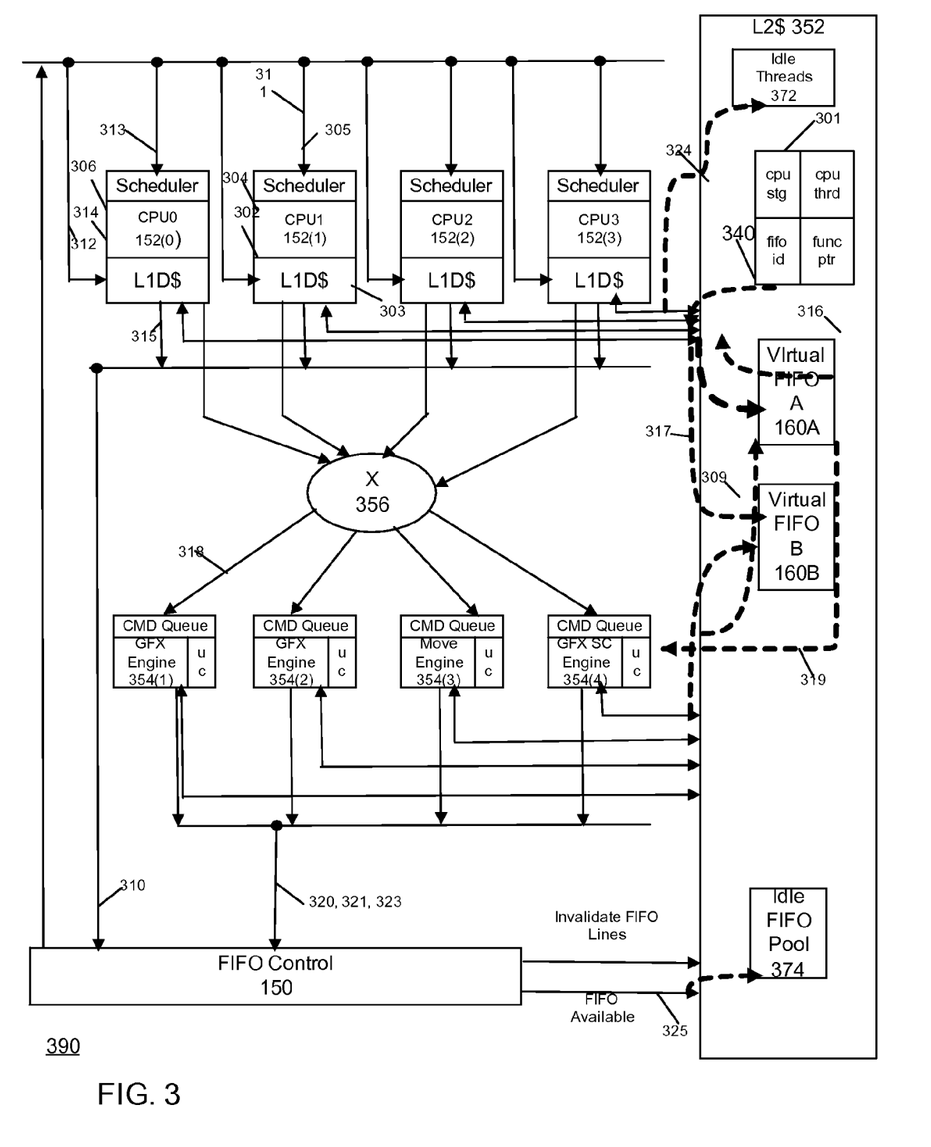
FIG. 3 is a block diagram of an exemplary parallel processing system utilizing virtual FIFOs according to one embodiment.

FIG. 3 is a block diagram of an exemplary parallel processing system utilizing virtual FIFOs according to one embodiment. Parallel processing system 390 may comprise CPU1-CPU4 (152(1)-152(4)), L2 cache 352, which is shared between CPUs 152(1)-152(4). Each CPU 152(1)-152(4) may be associated with a respective L1 cache. Parallel processing system 390 may further include an L2$ which is shared between CPUs 152(1)-152(4) and special purpose engines 354(1)-354(4) (described below).

Parallel processing system may also comprise special purpose engines 354(1)-354(4), which may be tailored to arithmetic computations, memory moves and other operations and which provide performance/W and performance/mm which is superior to CPUs 152(1)-152(4). According to example, three types of engines are shown: 1) general graphics engine (GFX) (354(1), 354(2)) for texture fetch, matrix multiply and possibly pixel operations; 2) a scan line engine (GFX SC) (354(3)), which performs scan line conversion and 3) a move engine (354(4)) which reduces the bandwidth pressure on the L1 caches by moving data within a shared L2$ 352. According to one embodiment, engines 354(1)-354(4) are microcoded engines. It is for purposes of this discussion that a microcode store is always resident, thought it could be overlayed with microcode fetched from L2$ 352. At crossbar 356, requests from CPUs 152(1)-152(4) may be distributed to the set of special purpose engines 354(1)-354(4).

Parallel processing system 390 may also comprise one or more virtual FIFOs in this example virtual FIFO A (160A) and virtual FIFO B (160B). According to one embodiment, virtual FIFOs 320A, 320B are not a separate hardware block. Instead, virtual FIFO data is stored in the L2$. Once written, data in the virtual FIFOs 160A, 160B can migrate to the L1$ of respective processors. Although FIG. 3A shows two virtual FIFOs 160A, 160B as an aid to explaining the operation of parallel processing system 390, an arbitrary number of virtual FIFOs could be employed in parallel processing system 390.

According to one embodiment FIFO control 150 may track the state and use of the virtual FIFOs (160A and 160B) and provide scheduling information to the processors 152(1)-152(4). FIFO control may also free memory as FIFOs drain and pushes FIFO data to the appropriate places in the system. To maintain the status of the FIFOs, FIFO Control 150 may receives status updates of various types from the processors 152(1)-152(4) and from the graphics engines 354(1)-354(4).

As an exemplary operation, the following processing stages will now described:
CPU1→virtual FIFO A→CPU0→virtual FIFO B . . .
According to the present example, the first two entries of the table may be:
(stage 1) (CPU1, thread n) (FIFO identifier A) (entry point)
(stage 2) (CPU0, thread m) (FIFO identifier B) (entry point)

In 301 a processing table 340 is created and processing is started. According to one embodiment, a driver or application may set up processing table 340. Processing table 340 may include entries which indicate which CPU/thread will perform each stage of processing, assign the FIFO id of the FIFO to which sits, logically, between one stage and the next and assign an entry point where processing begins.

In 302, Thread n on CPU 152(1) may then be started.

In 303, a FIFO identifier and next stage thread may be obtained. According to the present example, CPU 152(1) may read processing table 340 to obtain the CPU and thread which will perform the next stage of processing. In this example, this next stage CPU will be CPU 152(0), thread m. CPU 152(1) may also read an identifier for virtual FIFO 160A from processing table 340. A FIFO identifier may be used to construct addresses, which reference locations in the virtual FIFO 160A. According to one embodiment, a virtual FIFO (e.g., 160A) is assumed to be $2^n$ in length. This allows FIFO addresses to be constructed with simple masking. For flow control purposes it may be necessary to set a maximum record size in a virtual FIFO. The maximum record size may be the amount of data processed at one time by the next stage of processing. To maintain high performance the size of a virtual FIFO may be set to be many multiples of this largest record size.

In 304, CPU 152(1) may then send FIFO identifier and thread information to FIFO control 150. According to the present example, CPU 152(1) may then send information to FIFO control 150 including a FIFO identifier of the virtual FIFO which CPU 152(1) will fill (virtual FIFO 160A), the CPU/thread which will fill virtual FIFO 160A (CPU 152(1), thread n) and the CPU/thread which will drain virtual FIFO 160A (152(0), thread m).

In 305, FIFO control 150 may then supply thread availability information. In particular, after receiving the FIFO identifier and thread information from CPU 152(1), FIFO control 150 may determine which threads should be allowed to run. FIFO control 150 may then communicate with CPU 152(1) that thread n can be run (because virtual FIFO 160A is empty) and may further communicate with CPU 152(0) that thread m cannot be run (because virtual FIFO 160A is empty). According to an alternative embodiment, FIFO control 150 may feed the control information to a status register, which can be read by a CPU. A thread may polls the status register and shuts itself off if there is no data available for processing.

In 306, a next stage thread may then start. According to this example CPU 152(1) may initiate the processing on CPU 152(0). The thread executing on CPU 152(0) may be prevented from running by FIFO control 150 until there is data in virtual FIFO 160A because of the thread availability information sent from FIFO control 150A. After setup CPU 152(1)

may begin processing. CPU 152(1) may write directly to virtual FIFO 160A using normal writes. Because virtual FIFO 160A is in memory, any location in virtual FIFO 160A can be written. According to one embodiment, when FIFO addresses are first accessed, cachelines are allocated from the L2$ but are not fetched into the L1$.

In addition to writing to a virtual FIFO directly, a CPU can send commands to the graphics engines 354(1)-354(4) as shown in 308. The cmd queues may be implemented as FIFOs or as command records. According to one embodiment, crossbar 356 distributes the command to the next available graphics engine 354(1)-354(4).

In 309, the graphics engines 354(1)-354(4) may write directly to FIFO 160B. As a graphics engine (e.g., 354(1)-354(4)) processes commands, it can write data to a FIFO. As is the case with the CPU any location in a virtual FIFO can be written. As FIFO addresses are first accessed cachelines are allocated from the L2$ but are not fetched into the L1$.

According to this example, at this point all cachelines allocated for virtual FIFO 160A reside in the L2$ and only writes to virtual 160A have taken place. Therefore, the accesses by CPU 152(1) and all of the graphics engines are guaranteed to be coherent without the need to snoop the L1$. However, it is possible for a casteout of a cacheline allocated for virtual FIFO 160A may occur. According to one embodiment, if this happens then a miss in the L2$ should result in a fetch from the L3$, rather than the allocation of a new line.

In 310, FIFO data may be posted. As the graphics engine and the CPU fill virtual FIFO 160A, they may "post" the FIFO data, making it available for the next stage of processing. According to one embodiment, posting may be accomplished by sending the last address written to FIFO control 150. According to one embodiment, FIFO control 150 maintains addresses from both sources because there are no ordering guarantees between the writes from a graphics engine and CPU 152(0). According to this embodiment, is the responsibility of FIFO control 150 to insure that all writes to virtual FIFO 160A have completed before allowing the next stage of processing to access the data.

In 311, thread availability information for CPU 152(1) is updated. If virtual FIFO 160A fills above a threshold then FIFO control 150 indicates that thread n should be suspended. After virtual FIFO 160A is drained below a, possibly different, threshold FIFO control 50 may indicate that thread n can be run again.

In 312, data is prefetched from virtual FIFO 160A. As the data in virtual FIFO 160A is written FIFO control knows that CPU 152(1) will be reading the data. Therefore, FIFO control 150 may signal the L1D$ associated with CPU 152(0) that it should start prefetching this data. This will reduce the time spent servicing L1$ cache misses.

At 313, thread availability is provided for CPU 152(0). Once enough data is posted to virtual FIFO 160A (as indicated by threshold settings) FIFO control may indicate to CPU 152(0) that thread m can be run. At 314, thread m on CPU 152(0) may be resumed. After FIFO control 150 indicates that the thread is available processing starts.

At 315, CPU 152(0) sends CPU and thread information to FIFO control 150. In particular, CPU 152(0) may transmit the following information to FIFO Control: the FIFO identifier of the virtual FIFO which CPU 152(0) will fill (virtual FIFO 160B), the CPU/thread which will fill virtual virtual FIFO 160A (CPU 152(0), thread m) and the CPU/thread which will drain virtual FIFO 160A (not discussed in this example).

At 316, CPU 152(0) reads virtual FIFO 160A. CPU 152(0) may begin processing at the lowest address in virtual FIFO 160A and can randomly access any location in virtual FIFO 160A. However, according to one embodiment accesses may be restricted to the next record to avoid accessing cachelines, which are still being filled by CPU 152(1).

In 317, CPU 152(0) writes to virtual FIFO 160B. As CPU 152(0) processes data from virtual FIFO 160A it can write directly to virtual FIFO 160A.

In 318, commands are sent to graphics engines (e.g., 354(1)-354(4)). Just as CPU 152(1) did CPU 152(0) can send commands to the graphics engines for processing.

In 319, the graphics engines (e.g., 354(1)-354(4)) may access the virtual FIFOs (160A, 160B). The graphics engine can also read from virtual FIFO 160A and can write to virtual FIFO 160B.

In 320, virtual FIFO 160A space is released. According to one embodiment, after CPU 152(0) consumes data from virtual FIFO 160A, it sends a release to FIFO control 150. Similarly the graphics engines 354(1)-354(4) can send a release to FIFO control 150 when they are through reading data. FIFO control 150 may then use that information to maintain the state of virtual FIFO 160A.

According to one embodiment, the thread availability information for the consuming thread serves multiple purposes. The thread availability information may be used to insure that the consuming thread is not be allowed read invalid data. In addition, this information may be utilized to prevent the consuming thread from reading a cacheline that may still be written by the producing thread. This event may occur when the boundary between two records falls in the middle of a cacheline.

According to one embodiment, the delay between marking a thread as unavailable and when the reads to memory actually stop is tracked. The implementation envisioned in this example assumes that the threshold settings keep several records of spacing between the writes last posted by the producer and the data last released by the consumer. Thus, many clocks can pass between marking a thread as unavailable and the actual stopping of the thread.

According to one embodiment, it is also assumed that all writes to a cacheline in a virtual FIFO complete before any reads complete. Further, using a write through policy in the L2$ insures that the data will be in the L2$. This combination eliminates the need to snoop the L1$ of other processors when then consumer reads from the virtual FIFO.

In 321, FIFO data is posted. As CPU 152(0) and the graphics engines 354(1)-354(4) fill virtual FIFO 160B they may post FIFO addresses to FIFO control 150. In 322, thread availability information for CPU 152(0) is updated. If virtual FIFO 160B is filled above a threshold then FIFO control 150 may indicate that CPU 152(0) thread n should be suspended. After virtual FIFO 160B is drained below a, possibly different threshold FIFO control 150 may indicate that CPU 152(0) thread n can be run again.

In 323, completion of the processing is achieved. Eventually CPU 152(1) and the graphics engines (e.g., 354(1)-354(4)) it uses will complete all of their processing and place all data into virtual FIFO 160A. However, because FIFO control 150 is maintaining the spacing between producer and consumer FIFO control 150 will not, on the basis of the thresholds, allow CPU 152(0) thread m to continue execution. Therefore, when CPU 152(1) completes all processing it may send a completion message to FIFO control 150. In addition, completion information may be sent from the graphics processing engines 354(1)-354(4). Once FIFO control 150 determines that all writes have completed, it may transmit thread availability information to CPU 152(0) allowing thread m to run and completely drain virtual FIFO 160A.

In 324, idle threads table 172, which can be referenced to determine which threads can be used when constructing a processing table may be updated. When a thread completes processing it may update idle threads table 324.

In 325, virtual FIFO 160A releases its data. As CPU 152(0) thread m drains virtual FIFO_160A it will eventually release all of the data in the virtual FIFO. FIFO control 150 may then detect that all data, which was posted, has been released and the associated FIFO identifier can be added to an idle FIFO pool 374. Idle FIFO pool 374 may be used in the construction of new processing tables.

Figure 4:
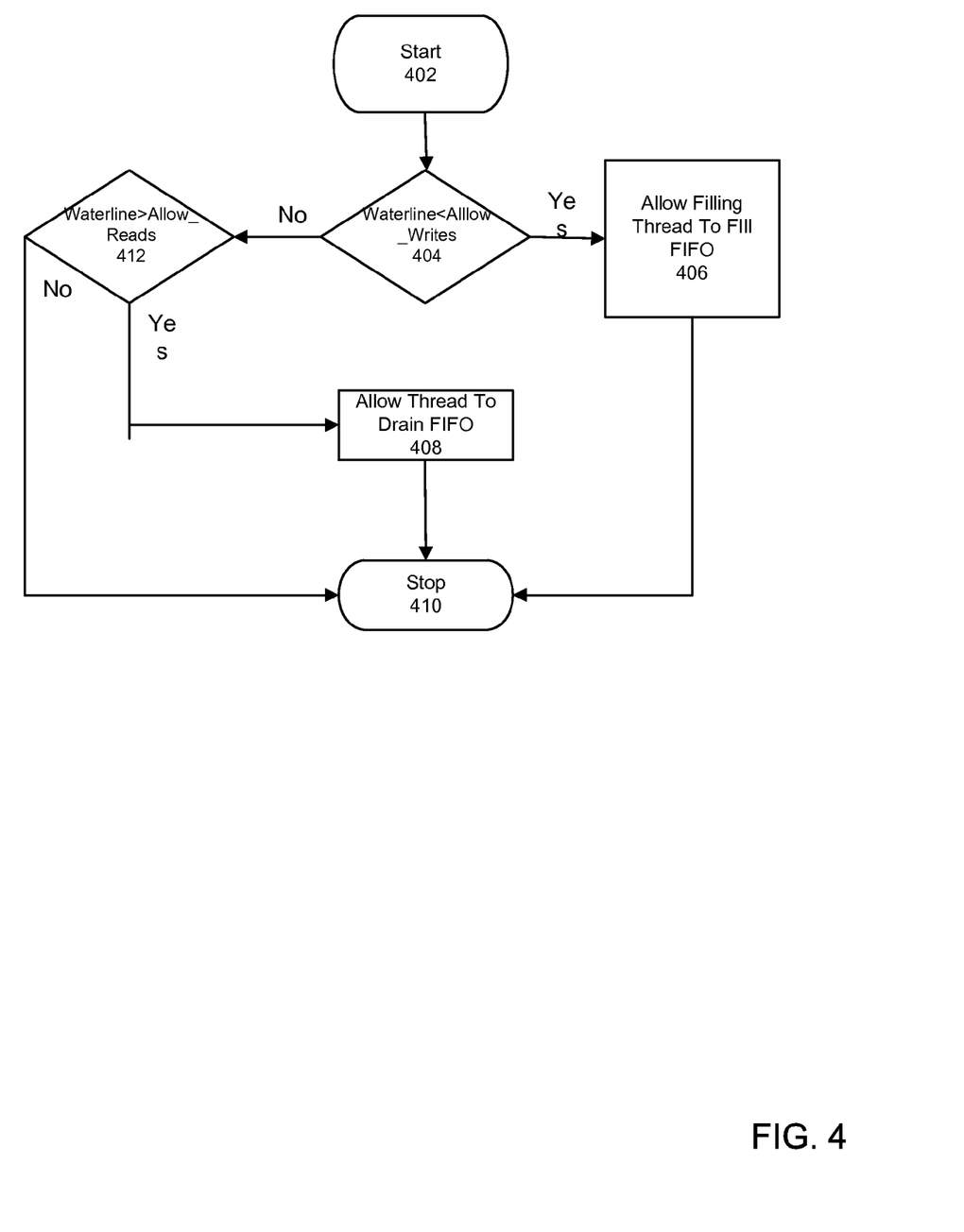
FIG. 4 is an exemplary flowchart of a process performed by a FIFO control block according to one embodiment.

FIG. 4 is a flowchart for a thread control process that may be performed by a FIFO control block according to one embodiment. According to this embodiment each FIFO may be associated with two watermarks, an Allow_Writes watermark and an Allow_Reads watermark. The process is initiated in 402. In 404, it is determined whether the waterline is less than the Allow_Writes watermark. If so ('yes' branch of 404), in 406 a filling thread is allowed to fill the FIFO. If not ('no' branch of 404), in 412 it is determined whether the waterline is above the Allow_Reads watermark. If not ('no' branch of 412), the process ends in 410. Otherwise ('yes' branch of 412), in 408 a draining thread is allowed to drain the FIFO. The process ends in 410. a thread is allowed to drain the FIFO. The process ends in 410.

Figure 5:
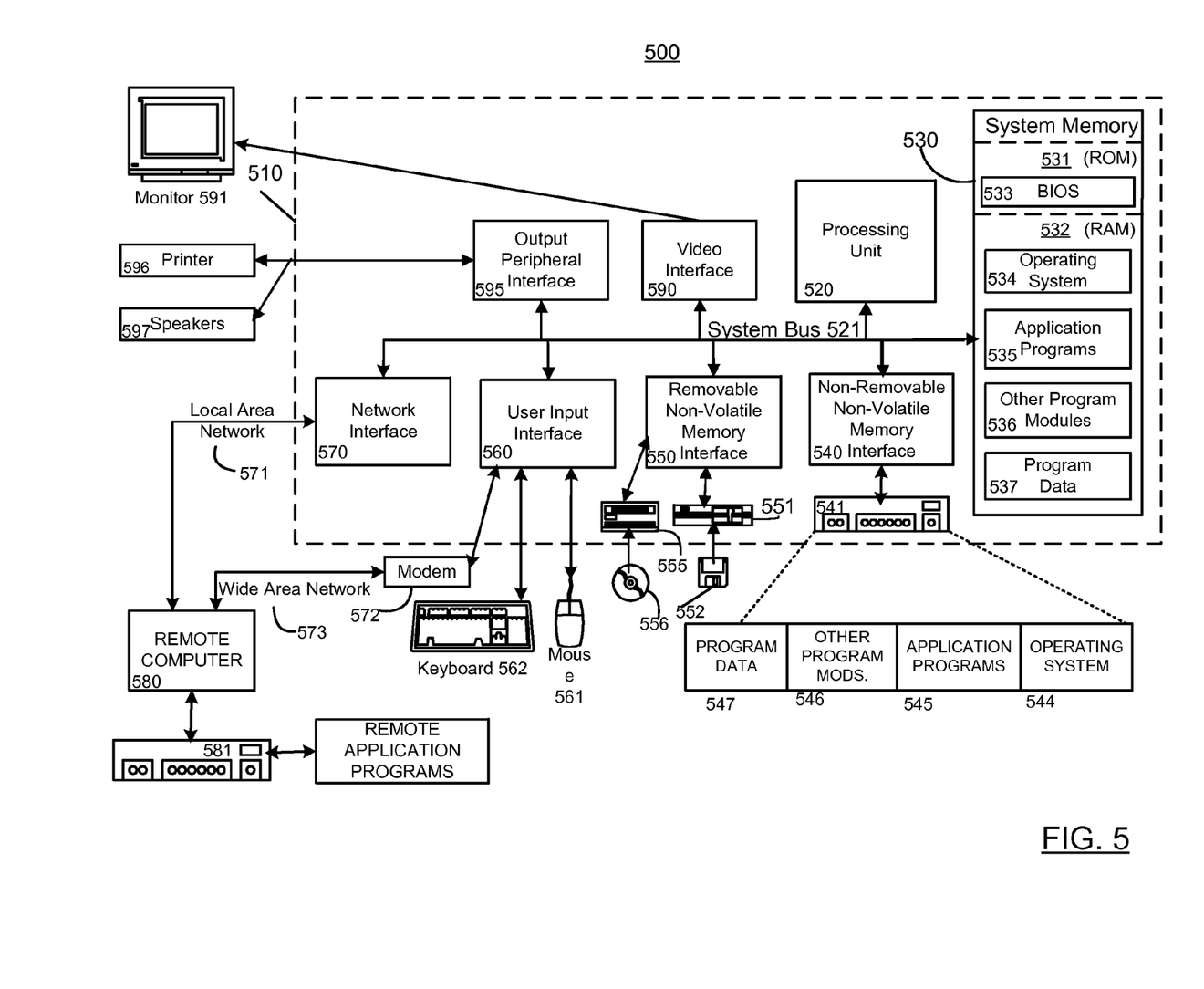
FIG. 5 is an exemplary system for implementing a general purpose computing device in the form of a computer.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A method for performing parallel processing of a computer code via a plurality of processors, the method comprising:
   (a) separating the computer code into a plurality of sequential stages, wherein each stage of the plurality of sequential stages comprises a respective portion of the computer code;
   (b) associating each stage of the plurality of sequential stages with a respective software thread, wherein each software thread is designated to execute on a respective processor of the plurality of processors;
   (c) for each stage of the plurality of sequential stages, when a respective stage includes software instructions for performing a data load having an expected latency exceeding a threshold:
      (i) modifying the respective portion of the computer code for a previous stage to perform a fill of data into a respective FIFO ("First In First Out") buffer;

(ii) modifying the respective portion of the computer code for the stage to drain data from the respective FIFO;

(d) based upon processing information for the plurality of stages, coordinating the parallel processing of the plurality of processors by performing scheduling of each software thread as a function of a state of each of the respective FIFOs.

2. The method of claim 1, wherein the processing information comprises:

information indicating a respective CPU and thread that will perform each stage of processing;

a respective FIFO identifier indicating a FIFO associated with each of at least one previous stage and subsequent stage; and a processing entry point.

3. The method of claim 2, wherein coordinating the parallel processing of the plurality of processors comprises:

modifying each respective portion of the software code for each stage to transmit a portion of the processing information to a FIFO control.

4. The method of claim 3, wherein the portion of the processing information comprises a FIFO identifier, a first identifier of a first thread that will fill the FIFO identified by the FIFO identifier, a second identifier of a first processor associated with the first thread, a third identifier of a second thread that will drain the FIFO and a fourth identifier of a second processor associated with the second thread.

5. The method of claim 1, wherein each respective FIFO is a virtual FIFO.

6. The method of claim 5, wherein each virtual FIFO is created in a shared memory area shared by each of the processors of the plurality of processors.

7. The method of claim 6, wherein the shared memory area is a level 2 cache.

8. A computer readable storage medium comprising instructions for performing processing in a multi-processor environment comprising a plurality of processors, comprising:

(a) separating the computer code into a plurality of sequential stages, wherein each stage of the plurality of sequential stages comprises a respective portion of the computer code;

(b) associating each stage of the plurality of sequential stages with a respective software thread, wherein each software thread is designated to execute on a respective processor of the plurality of processors;

(c) for each stage of the plurality of sequential stages if the stage includes software instructions for performing a data load having an expected latency exceeding a threshold:

(i) modifying the respective portion of the computer code for a previous stage to perform a fill of data into a respective FIFO ("First In First Out") buffer;

(ii) modifying the respective portion of the computer code for the stage to drain data from the respective FIFO;

(d) based upon processing information for the plurality of stages, coordinating the parallel processing of the plurality of processors by performing scheduling of each software thread as a function of a state of each of the respective FIFOs.

9. The computer readable storage medium of claim 8, wherein the processing information comprises:

information indicating a respective CPU and thread that will perform each stage of processing;

a respective FIFO identifier indicating a FIFO associated with each of at least one previous stage and subsequent stage; and a processing entry point.

10. The computer readable storage medium of claim 9, wherein coordinating the parallel processing of the plurality of processors comprises:

modifying each respective portion of the software code for each stage to transmit a portion of the processing information to a FIFO control.

11. The computer readable storage medium of claim 10, wherein the portion of the processing information comprises a FIFO identifier, a first identifier of a first thread that will fill the FIFO identified by the FIFO identifier, a second identifier of a first processor associated with the first thread, a third identifier of a second thread that will drain the FIFO and a fourth identifier of a second processor associated with the second thread.

12. The computer readable storage medium of claim 11, wherein each respective FIFO is a virtual FIFO.

13. The computer readable storage medium of claim 12, wherein each virtual FIFO is created in a shared memory area shared by each of the processors of the plurality of processors.

14. The computer readable storage medium of claim 13, wherein the shared memory area is a level 2 cache.

15. A system for performing a parallel processing of a computer code comprising:

a plurality of processors;

a first processor, the first processor separating the computer code into a plurality of stages;

a shared memory area accessible to each of the plurality of processors for storing:

a plurality of FIFO data structures;

a processing table, the processing table storing information associating a CPU and a thread with each stage of the processing;

a plurality of FIFO identifiers, each FIFO identifier associated respectively with a first stage and a second stage;

an entry point for the processing;

a FIFO control module, wherein the FIFO control module:

initiates the parallel processing using the entry point;

receives information indicating a FIFO identifier, a first identifier of a second processor that will fill the FIFO, a second identifier of a first thread associated with the second processor, a third identifier of a third processor that will drain the FIFO, a fourth identifier of a second thread associated with the third processor;

receives posting information after data is available to be read by a subsequent stage;

performs thread control for each of the plurality of processors based upon a state of the FIFOs.

16. The system of claim 15, wherein the FIFO control allows a thread filling a FIFO to run if the FIFO is empty.

17. The system of claim 15, wherein the FIFO control prevents a thread reading a FIFO from running if the FIFO is empty.

18. The system of claim 15, wherein the FIFO control suspends a thread filling a FIFO if the FIFO has acquired data exceeding a threshold point.

19. The system of claim 15, wherein the FIFO control starts a thread reading a FIFO if the FIFO has acquired data exceeding a threshold point.

20. The system of claim 15, wherein shared memory area is a level two cache.

* * * * *